(12) United States Patent
Melakari

(10) Patent No.: US 11,885,972 B1
(45) Date of Patent: Jan. 30, 2024

(54) OPTICAL ELEMENT HAVING PERIPHERAL FOVEATING REGION

(71) Applicant: Pixieray Oy, Espoo (FI)

(72) Inventor: Rebecca Qing Melakari, Espoo (FI)

(73) Assignee: Pixieray Oy, Espoo (FI)

( * ) Notice: Subject to any disclaimer, the term of this patent is extended or adjusted under 35 U.S.C. 154(b) by 0 days.

(21) Appl. No.: 17/987,938

(22) Filed: Nov. 16, 2022

(51) Int. Cl.
*G02B 27/01* (2006.01)
*G06F 3/01* (2006.01)
*G06T 7/70* (2017.01)

(52) U.S. Cl.
CPC ......... *G02B 27/0172* (2013.01); *G06F 3/013* (2013.01); *G06T 7/70* (2017.01)

(58) Field of Classification Search
None
See application file for complete search history.

(56) References Cited

U.S. PATENT DOCUMENTS 11,086,143 B1 * 8/2021 Gill ................... G02F 1/13471

* cited by examiner

*Primary Examiner* — Nicholas J Lee
(74) *Attorney, Agent, or Firm* — Ziegler IP Law Group

(57) ABSTRACT

An optical element includes: a central region having a fixed optical power, wherein the fixed optical power is one of: a zero optical power, a negative optical power; and a peripheral region surrounding the central region, at least a portion of the peripheral region having an adjustable optical power, wherein the optical power of the portion of the peripheral region is to be selectively adjusted to produce a given optical power. When the fixed optical power is the zero optical power, the given optical power is a positive optical power. When the fixed optical power is the negative optical power, the given optical power is one of: the positive optical power, the negative optical power.

18 Claims, 5 Drawing Sheets

OPTICAL ELEMENT HAVING PERIPHERAL FOVEATING REGION

TECHNICAL FIELD

The present disclosure relates to optical elements having peripheral foveating regions. The present disclosure also relates to optical apparatuses comprising such optical elements. The present disclosure further relates to methods of manufacturing such optical elements.

BACKGROUND

Age-related vision degradation is common in humans. As a person ages, a biological lens of her/his eye gradually loses some of its flexibility, which results in a gradual decline in an auto-focusing ability of the eye. Therefore, blurred vision and difficulty in focusing on objects at different distances are common issues related to vision degradation. Using powered eyeglasses for vision correction is therefore common.

When vision is to be corrected both for distance viewing and reading, eyeglasses implementing multifocal lenses (for example, such as bifocal, trifocal and progressive lenses) are commonly used. Such multifocal lenses incorporate two different prescriptions (namely, for distance viewing and reading) in a single lens. However, users often find it difficult to accommodate with such multifocal lenses. This is primarily because such a multifocal lens has multiple optical centres, and an area between these optical centres is prone to distortion, peripheral aberrations, and prismatic artefacts. Moreover, manufacturing such lenses is usually difficult and expensive.

In an attempt to overcome this problem, some conventional optical elements are implemented as focus-tunable lenses, which have an ability to change their optical power in response to an electric signal. However, conventional focus-tunable lenses suffer from several disadvantages. Firstly, some conventional focus-tunable lenses provide a reading power over its entire area. This requires a lot of electrical power to operate such lenses and also requires that the reading power and a distance power is switched very fast (for example, in an order of <500 milliseconds) during use. Secondly, other conventional focus-tunable lenses provide the reading power in a fixed part of their area. This makes them very similar to multifocal lenses in that they do not provide any flexibility to a user.

Therefore, in light of the foregoing discussion, there exists a need to overcome the aforementioned challenges associated with conventional optical elements and optical apparatuses employing such optical elements.

SUMMARY

The present disclosure seeks to provide an improved optical element. The present disclosure also seeks to provide an optical apparatus comprising such an optical element. The present disclosure further seeks to provide a method of manufacturing such an optical element. An aim of the present disclosure is to provide a solution that overcomes at least partially the problems encountered in prior art.

In a first aspect, an embodiment of the present disclosure provides an optical element comprising:
a central region having a fixed optical power, wherein the fixed optical power is one of: a zero optical power, a negative optical power; and
a peripheral region surrounding the central region, at least a portion of the peripheral region having an adjustable optical power, wherein the optical power of the portion of the peripheral region is to be selectively adjusted to produce a given optical power,
wherein when the fixed optical power is the zero optical power, the given optical power is a positive optical power, and
when the fixed optical power is the negative optical power, the given optical power is one of: the positive optical power, the negative optical power.

In a second aspect, an embodiment of the present disclosure provides an optical apparatus comprising at least one optical element of the first aspect.

In a third aspect, an embodiment of the present disclosure provides a method of manufacturing an optical element, the method comprising:
arranging at least one active optical element to surround a passive optical element;
drawing electrical connections from the at least one active optical element; and
laminating the at least one active optical element together with the passive optical element to produce the optical element,
wherein a central region of the optical element, comprising the passive optical element, has a fixed optical power, the fixed optical power being one of: a zero optical power, a negative optical power, and
wherein at least a portion of a peripheral region of the optical element, comprising the at least one active optical element, has an adjustable optical power.

Embodiments of the present disclosure substantially eliminate or at least partially address the aforementioned problems in the prior art, and provide a fixed optical power in the central region of the optical element, whilst dynamically and selectively producing a given optical power in at least a portion of the peripheral region of the optical element.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1A:
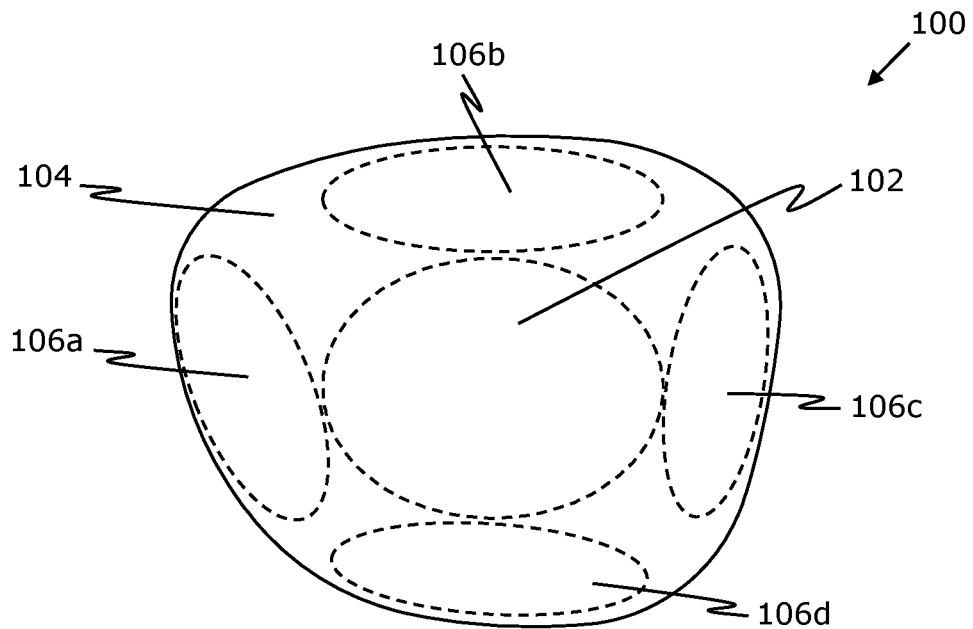
FIGS. 1A and 1B illustrate schematic diagrams of an optical element, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an optical element comprising:

a central region having a fixed optical power, wherein the fixed optical power is one of: a zero optical power, a negative optical power; and a peripheral region surrounding the central region, at least a portion of the peripheral region having an adjustable optical power, wherein the optical power of the portion of the peripheral region is to be selectively adjusted to produce a given optical power, wherein when the fixed optical power is the zero optical power, the given optical power is a positive optical power, and when the fixed optical power is the negative optical power, the given optical power is one of: the positive optical power, the negative optical power.

In a second aspect, an embodiment of the present disclosure provides an optical apparatus comprising at least one optical element of the first aspect.

In a third aspect, an embodiment of the present disclosure provides a method of manufacturing an optical element, the method comprising:

arranging at least one active optical element to surround a passive optical element;

drawing electrical connections from the at least one active optical element; and laminating the at least one active optical element together with the passive optical element to produce the optical element, wherein a central region of the optical element, comprising the passive optical element, has a fixed optical power, the fixed optical power being one of: a zero optical power, a negative optical power, and wherein at least a portion of a peripheral region of the optical element, comprising the at least one active optical element, has an adjustable optical power.

The present disclosure provides the aforementioned optical element, the aforementioned optical apparatus, and the aforementioned method. Pursuant to embodiments, providing the fixed optical power in the central region of the optical element, whilst dynamically and selectively producing the given optical power in at least a portion of the peripheral region of the optical element facilitates a user to experience high visual acuity and minimum haze level when looking in a real-world environment via different regions of said optical element (at different points in time). Selectively producing the given optical power in the peripheral region, whilst providing the fixed optical power at the central region is beneficial for most practical purposes, because users typically use only the peripheral region for reading or looking at nearby objects and use the central region for distance viewing. As an example, an electrician or an automotive technician may need to see through a top part of the optical element for their respective occupational purposes. As another example, a pilot may need to see through a bottom part as well as a top part of the optical element, as she/he needs to see controls that are provided in an instrument panel as well as an overhead panel of a cockpit.

Moreover, the optical element can produce spatially-variable optical power, thereby enabling a user to focus on objects at a wide range of distances in a reproducible manner. As a result, the optical apparatus comprising such optical element is optically efficient, while having low power requirements. The optical element is susceptible to be implemented in various types of optical apparatuses, for example, such as a pair of glasses, a pair of sunglasses, smart glasses, and a head-mounted display, or similar. Moreover, the method of manufacturing can be implemented with ease.

The positive optical power is used for reading or focussing on nearby objects, while the zero optical power or the negative optical power (depending on whether or not the user has myopia) is used for distance viewing, i.e., to see faraway (namely, distant) objects. It will be appreciated that the zero optical power or the negative optical power is often required to be used more frequently than the positive optical power during a typical day, and hereinafter is referred to as a base optical power for the sake of convenience.

In a case where the user has presbyopia only, the fixed optical power is the zero optical power; that is, the zero optical power would be provided at the central region. In such a case, the positive optical power can be produced in an entirety of the peripheral region when the user has to read or to look at nearby objects. Alternatively, if it can be known that the user is reading or looking at the nearby objects through a particular portion of the peripheral region (for example, a top portion of the peripheral region), then the positive optical power can be selectively produced in that particular portion only, whilst the zero optical power can be produced in a remaining portion of the peripheral region. In the aforesaid case, if it can be known that the user is not reading or looking at the nearby objects, the zero optical power would be produced at the entirety of the peripheral region. Beneficially, this enables the user to see all the objects (whether nearby or faraway) clearly at all times, and also allows to widen the field of view for distance viewing (namely, to an entirety of the optical element) when the user does not need the positive optical power.

In another case where the user has both presbyopia and myopia, the fixed optical power is the negative optical power; that is, the negative optical power would be provided at the central region. In such a case, the positive optical power can be produced in an entirety of the peripheral region when the user has to read or to look at nearby objects. Alternatively, if it can be known that the user is looking at the nearby objects through a particular portion of the peripheral region (for example, the top portion of the peripheral region), then the positive optical power can be selectively produced in that particular portion only, whilst the negative optical power can be produced in the remaining portion of the peripheral region. In the another case, if it can be known that the user is not reading or looking at the nearby objects, the negative optical power would be produced at the entirety of the peripheral region. Beneficially, this enables the user to see all the objects (whether nearby or faraway) clearly at all times, and also allows to widen the field of view for distance viewing (namely, to an entirety of the optical element) when the user does not need the positive optical power.

In this way, the optical power of at least the portion of the peripheral region can be selectively adjusted as and when required. It will be appreciated that different optical powers can be produced at different portions of the peripheral region of the optical element, as explained above. Moreover, in implementations where the positive optical power is produced in the entirety of the peripheral region, an intermediate region of the optical element at a boundary of the central region and the peripheral region can have an optical power that enables smooth transitioning from the positive optical power to the base optical power. In other implementations where the positive optical power is only produced in a particular portion of the peripheral region (through which the user is reading or looking at nearby objects), an intermediate portion of the peripheral region at a boundary of that particular portion and the remaining portion of the peripheral region can have an optical power that enables smooth transitioning from the positive optical power to the base optical power (produced in the remaining portion of the peripheral region).

Pursuant to embodiments, an entirety of the central region of the optical element has a non-adjustable optical power, i.e., the fixed optical power. Optionally, the central region is shaped as a simple closed curve. Herein, the term "simple closed curve" refers to a connected curve that does not cross itself, and ends at the same point where it begins. Examples of the simple closed curves include, but are not limited to, quadrilaterals, hexagons, octagons, circles, and ellipses. It will be appreciated that despite being called as a "curve", a given simple closed curve does not actually have to be curved in shape. Some simple closed curves are made of line segments only, and are known as polygons (for example, such as quadrilaterals, hexagons, octagons, and the like), while some simple closed curves are made by curved lines only (for example, such as circles and ellipses). Other simple closed curves are made of both line segments and curved lines. Optionally, the central region is shaped as a circle having a diameter that lies in a range of 20 millimetres to 35 millimetres; more optionally, in a range of 25 millimetres to 30 millimetres.

Optionally, the central region comprises a passive optical element, and the peripheral region comprises at least one active optical element comprising:
 a first substrate and a second substrate that are optically transparent;
 an active material encased between the first substrate and the second substrate;
 at least one first electrode deposited on the first substrate and disposed between the first substrate and the active material, the at least one first electrode being optically transparent; and
 at least one second electrode deposited on the second substrate and disposed between the second substrate and the active material, the at least one second electrode being optically transparent.

Throughout the present disclosure, the term "passive optical element" refers to an optical element whose optical power cannot be changed. In other words, the optical power of the passive optical element is fixed (namely, non-adjustable or static). Optionally, the passive optical element is implemented as any one of: the first substrate, the second substrate. Furthermore, the term "active optical element" refers to an optical element whose optical power can be changed. In other words, the optical power of the at least one active optical element is adjustable. In this regard, the at least one active optical element is (optionally electrically) controlled to produce the given optical power at: at least the portion of the peripheral region.

Throughout the present disclosure, the term "active material" refers to a material that is controlled to produce a particular optical power at a particular portion of the peripheral region. By "controlling the active material", it is meant that at least one of: a curvature of a meniscus of the active material, a refractive index of the active material can be controlled in the at least one active optical element, as discussed later.

Optionally, the at least one first electrode is deposited as a transparent electrode layer on the first substrate. In such a case, the electrode layer covers an entirety of a surface of the first substrate, such that the electrode layer is disposed between said surface of the first substrate and the active material. Alternatively, optionally, the at least one first electrode comprises a plurality of first electrodes that are deposited as a non-continuous, transparent electrode layer comprising separate, unconnected segments of said electrode layer on the first substrate. Likewise, optionally, the at least one second electrode is deposited as a transparent electrode layer on the second substrate. In such a case, the electrode layer covers an entirety of a surface of the second substrate, such that the electrode layer is disposed between said surface of the second substrate and the active material. Alternatively, optionally, the at least one second electrode comprises a plurality of second electrodes that are deposited as a non-continuous, transparent electrode layer comprising separate, unconnected segments of said electrode layer on the second substrate. In such a case, the plurality of second electrodes could be aligned with respective ones of the plurality of first electrodes.

It will be appreciated that a given electrode layer may, for example, be made of indium tin oxide (ITO) or doped zinc oxide (ZnO), where ZnO is doped with aluminium or hydrogen. Alternatively, the given electrode layer may be made of a conductive polymer or graphene.

It will be appreciated that a refractive index of the first substrate can be same as or different from a refractive index of the second substrate. The fixed optical power that is to be produced by the passive optical element depends on the curvature of surfaces of the first substrate and/or the second substrate. Moreover, the first substrate and/or the second substrate can be made of any one of: glass, a polycarbonate, a plastic, a high-index plastic. A person skilled in the art will recognize many variations, alternatives, and modifications of embodiments of the present disclosure.

Moreover, in an embodiment, the at least one active optical element comprises a plurality of active optical elements, wherein the portion of the peripheral region having the adjustable optical power is discontinuous. In this regard, the plurality of active optical elements are sparsely arranged in the peripheral region to cover different portions of the peripheral region. Optionally, in this regard, the plurality of active optical elements are elliptical in shape. Optionally, a remaining space of the peripheral region (that is, a space left between the plurality of active optical elements) has the fixed optical power. Said remaining space could be in a form of an extension of the passive optical element from which the central region is made. Alternatively, said remaining space could be made of another passive optical element.

In the aforesaid embodiment, only those active optical elements (from amongst the plurality of active optical elements) that are responsible for producing an optical power at a particular portion of the peripheral region are to be selectively controlled to produce the given optical power at that particular portion of the peripheral region. Thus, the given optical power need not necessarily be produced in an entire, continuous peripheral region of the optical element. It will be appreciated that different optical powers could be produced at the different portions of the peripheral region in a discontinuous manner by activating different active optical elements of the different portions of the peripheral region selectively. As an example, said different optical powers could be produced in a discontinuous manner, for example, such as on a left portion, a right portion, a top portion, or a bottom portion of the peripheral region, and thus need not necessarily be produced in an entire and continuous peripheral region of the optical element. Moreover, when a user is looking through, for example, a left portion of the peripheral region, the optical power is required to be produced only on the left portion.

In another embodiment, the at least one active optical element comprises a single active optical element that is in a form of an annular ring, and wherein the portion of the peripheral region having the adjustable optical power is continuous. It will be appreciated that, in such a case, the first substrate and the second substrate can be made in a shape of the annular ring, and the aforesaid electrodes can then be deposited over the aforesaid substrates. In the aforesaid embodiment, the single active optical element is arranged to cover an entirety of the peripheral region. In such a case, different portions of the single active optical element can be selectively controlled to produce the given optical power at: at least the portion of the peripheral region.

Furthermore, optionally, the at least one first electrode is driven at: at least one given voltage that corresponds to the given optical power to be produced. In a case of the plurality of active optical elements, at least one of the plurality of active optical elements can be selectively controlled to produce the given optical power at a corresponding portion of the peripheral region; thus, the at least one first electrode of the at least one of the plurality of active optical elements is driven at the at least one given voltage. In a case of the single active optical element, at least a portion of the single active optical element can be selectively controlled to produce the given optical power at a corresponding portion of the peripheral region; in such a case, the single active optical element has the plurality of first electrodes, wherein at least one of the plurality of first electrodes corresponding to the aforesaid portion of the single active optical elements is driven at the at least one given voltage.

In order to produce the given optical power at the portion of the peripheral region, the active material in the at least one active optical element is controlled by generating a potential difference between the at least one first electrode and the at least one second electrode. In some implementations, when a zero potential difference is generated (namely, by applying a same voltage to both the aforesaid electrodes or by connecting both the aforesaid electrodes to an electrical ground), the portion of the peripheral region is in an 'OFF' mode in which said portion has a base optical power, which may be a negative optical power or a zero optical power depending on user's requirement. In other implementations, the portion of the peripheral region is in an 'ON' mode in which the given optical power is produced at the portion of the peripheral region, when a given potential difference is generated between the at least one first electrode and the at least one second electrode depending on the given optical power that is to be produced. In this regard, the at least one first electrode and the at least one second electrode can be supplied varying voltages to allow different amounts of the potential difference to be generated therebetween. It will be appreciated that when the at least one first electrode is driven at the at least one given voltage, the at least one second electrode may be connected to an electrical ground.

Optionally, the at least one active optical element further comprises a processor configured to:
  select the at least one given voltage based on the given optical power to be produced; and
  generate a drive signal to drive the at least one first electrode.

In this regard, the at least one given voltage is selected according to the given optical power that is required to be produced at the portion of the peripheral region. Subsequently, the drive signal is generated based on the given optical power that is to be produced, for driving the at least one first electrode. The drive signal selectively addresses the portion of the peripheral region, for producing the given optical power thereat. In other words, the active material in the at least one active optical element is to be controlled by the at least one first electrode. It will be appreciated that a given processor could be implemented as any one of: a microprocessor, a microcontroller, or a controller. As an example, the processor could be implemented as an application-specific integrated circuit (ASIC) chip or a reduced instruction set computer (RISC) chip.

Optionally, the at least one first electrode is driven to control at least one of: a curvature of a meniscus, a refractive index, of the active material in the at least one active optical element. In some implementations, the given optical power is produced by controlling the curvature of the meniscus of the active material. As an example, in such implementations, the at least one active optical element is implemented as a liquid lens or a liquid oil lens. In other implementations, the given optical power is produced by creating a relative refractive index between the active material and the substrates (namely, the first substrate and the second substrate). As an example, in such implementations, the at least one active optical element is implemented as a liquid crystal lens. In both the aforesaid implementations, the drive signal for driving the at least one first electrode is generated based on the given optical power that is to be produced.

In a first implementation, the active material comprises an electrically-conducting liquid and an electrically-insulating liquid, wherein the curvature of the meniscus of the active material is controlled to produce the given optical power, the meniscus being a liquid-liquid interface between the electrically-conducting liquid and the electrically-insulating liquid. In this regard, the electrically-conducting liquid and the electrically-insulating liquid have different refractive indices; therefore, a particular curvature of the meniscus produces the given optical power. The aforesaid implementation works on the principle of electro-wetting, wherein the curvature of the meniscus of the active material changes with a change in a potential difference generated between the at least one first electrode and the at least one second electrode. Thus, the given optical power is produced based on an amount of said potential difference. In an example, the electrically-conducting liquid may be dibutyl adipate and the electrically-insulating liquid may be an oil.

In a second implementation, the active material is a liquid crystal material, wherein an alignment of liquid crystal molecules in the liquid crystal material is controlled to adjust the refractive index of the liquid crystal material, thereby producing the given optical power. In this regard, the alignment of the liquid crystal molecules in the liquid crystal material changes with a change in a potential difference generated between the at least one first electrode and the at least one second electrode. Notably, the liquid crystal material may be capable of providing an optical power up to +3 dioptres. It will be appreciated that in a case where the active material is the liquid crystal material, manufacturing of the active optical elements would be easier and economical, as certain processes of existing liquid-crystal display (LCD) manufacturing could be employed for manufacturing such active optical elements.

Optionally, the at least one active optical element further comprises a first dielectric layer disposed between the first substrate and the at least one first electrode, and a second dielectric layer disposed between the second substrate and the at least one second electrode. The first dielectric layer and the second dielectric layer may, for example, be made of silicon oxide (SiOx). Moreover, optionally, the at least one active optical element further comprises a sealing contour of a polymer material that seals the liquid crystal material between the first substrate and the second substrate. The sealing contour not only keeps the liquid crystal material inside, but also protects the liquid crystal material from air (mainly, oxygen) and dust (ambient atmosphere), and thus, ensures a reliable operation of the active optical element.

The second implementation includes various different sub-implementations, for example, such as a sub-implementation 'A' that works on the principle of refractive index matching, and a sub-implementation 'B' that works on the principle of liquid crystal Fresnel lenses, which are now discussed hereinbelow.

Figures 2A, 2B:
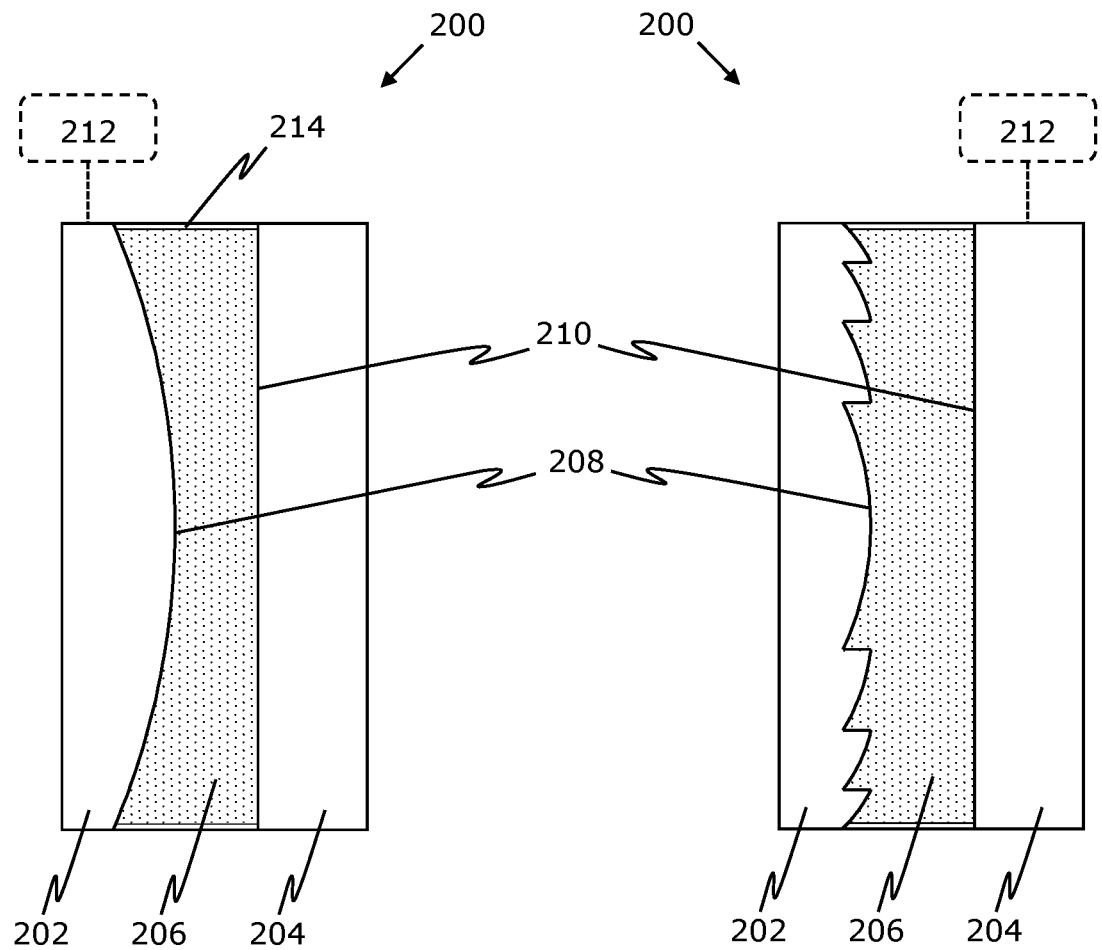
FIGS. 2A-2C illustrate cross-sectional views of an active optical element, in accordance with various embodiments of the present disclosure.
Figure 2C:
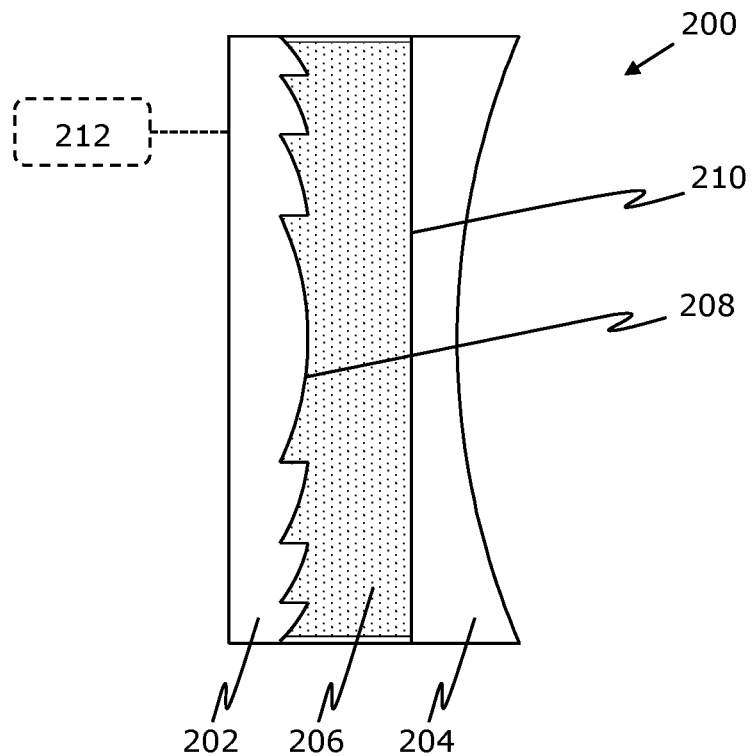

Some examples of the sub-implementation 'A' have been illustrated in conjunction with FIGS. 2A-2C. In the sub-implementation 'A' of the second implementation, at least one of the first substrate, the second substrate is optionally implemented as a Fresnel lens having concentric grooves, wherein the concentric grooves face the liquid crystal material encased between the first substrate and the second substrate. The at least one of the first substrate, the second substrate that is implemented as a Fresnel lens is hereinafter referred to as the "Fresnel substrate", for the sake of convenience only. The shape of the concentric grooves can be refractive or diffractive.

In the sub-implementation 'A', the concentric grooves of the Fresnel substrate can be formed to emulate characteristics of a planoconvex lens whose curvature corresponds to the given optical power that is to be produced. When the refractive index of the liquid crystal material is adjusted to match a refractive index of the Fresnel substrate, an interface between the liquid crystal material and the concentric grooves of the Fresnel substrate disappears. As a result, the at least one active optical element produces the base optical power, which may be a negative optical power or a zero optical power depending on the user's need. When the refractive index of the liquid crystal material is adjusted to be different from (optionally, to be lower than) the refractive index of the Fresnel substrate, the given optical power is produced at the given portion of the peripheral region.

The technical benefit of employing the Fresnel substrate in the sub-implementation 'A' is that it allows the at least one active optical element to operate with a thin layer of the liquid crystal material. Thinner the layer of the liquid crystal material, lower is the amount of potential difference that is required to adjust the refractive index of the liquid crystal material. Thus, electrical power requirements of the at least one active optical element are reduced greatly.

In the sub-implementation 'B' of the second implementation, the active optical element is implemented as a liquid crystal Fresnel lens. The liquid crystal Fresnel lens has concentric zones, which are formed entirely by adjusting the refractive index of the liquid crystal material in said concentric zones by applying different voltages in a plurality of first electrodes (which are arranged in a form of a plurality of concentric rings). In other words, these concentric zones are not physical grooves, and are formed by applying the different voltages to the liquid crystal material itself. This liquid crystal Fresnel lens can be controlled to produce the base optical power (namely, the fixed optical power) or the positive optical power, depending on whether the user is looking at nearby objects or faraway objects, or whether the user is looking through said liquid crystal Fresnel lens or not. It will be appreciated that in a case where the base optical power is a negative optical power, the concentric zones of the liquid crystal Fresnel lens can be formed to emulate characteristics of a planoconcave lens whose curvature corresponds to the base optical power. In a case where the positive optical power is to be produced, the concentric zones of the liquid crystal Fresnel lens can be formed to emulate characteristics of the planoconvex lens whose curvature corresponds to the positive optical power. An example of such a liquid crystal Fresnel lens has been illustrated in conjunction with FIG. 4.

Some other sub-implementations of the second implementation could be as follows:

In a sub-implementation 'C', the at least one active optical element may be implemented as a liquid crystal lens, in which the at least one first electrode comprises a plurality of concentric electrodes and a transmission line acting as a voltage divider, which distributes the voltage homogeneously across an active area of the liquid crystal lens. One such liquid crystal lens is described, for example, in "*Positive-negative tunable liquid crystal lenses based on a microstructured transmission line*" by J. F. Algorri et al., published in Scientific Reports, Vol. 10, 2020, which has been incorporated herein by reference.

In a sub-implementation 'D', the at least one active optical element may be implemented as a diffractive lens comprising two cascaded spiral diffractive lenses that are based on liquid crystal. One such diffractive lens is described, for example, in "*Adaptive spiral diffractive lenses—lenses with a twist*" by M. A. Geday et al., published in Advanced Optical Materials, Vol. 8, 2020, which has been incorporated herein by reference.

In a sub-implementation 'E', the at least one active optical element may be implemented as a liquid crystal lens having a spiral-shaped transparent electrode (instead of a traditional weakly conductive layer). One such liquid crystal lens is described, for example, in "*Electrically variable liquid crystal lens with spiral electrode*" by A. Pusenkova et al., published in Optics Communications, Vol. 508, 2022, which has been incorporated herein by reference.

The present disclosure also relates to the optical apparatus of the second aspect and to the method of the third aspect as described above. Various embodiments and variants disclosed above, with respect to the aforementioned first aspect, apply mutatis mutandis to the optical apparatus and to the method.

Throughout the present disclosure, the term "optical apparatus" refers to an apparatus that is to be worn over eyes of the user. Examples of such an optical apparatus include, but are not limited to, a pair of glasses, a pair of sunglasses, smart glasses, and a head-mounted display.

Optionally, the optical apparatus further comprises eye-tracking means and a processor configured to:
- process eye-tracking data, collected by the eye-tracking means, to determine a gaze direction of a given eye of a user in front of which the optical element is being worn; and
- select the portion of the peripheral region whereat the given optical power is to be produced, based on the gaze direction of the given eye of the user.

Throughout the present disclosure, the term "eye-tracking means" refers to specialized equipment that is employed to detect and/or follow a direction of gaze of the user of the optical apparatus. Such eye tracking is performed when the optical apparatus, in operation, is worn by the user over his/her eyes. Optionally, the eye-tracking means is implemented by way of contact lenses having sensors, cameras monitoring features of the user's eye, and the like. Such features may comprise at least one of: a shape of a pupil of the user's eye, a size of the pupil, corneal reflections of at least one light source from a surface of the user's eye, a relative position of the pupil with respect to the corneal reflections, a relative position of the pupil with respect to corners of the user's eye. Such eye-tracking means are well-known in the art. The term "gaze direction" refers to a direction in which the given eye of the user is gazing.

It will be appreciated that when the user (using the optical apparatus) looks in a real-world environment, a portion of the peripheral region whereat the gaze direction of the given eye of the user intersect the peripheral region can be easily identified to be the portion of the peripheral region whereat the given optical power is to be produced. It is to be understood that when user's gaze is directed (namely, focused) towards a region within the real-world environment, a gaze direction of a first eye and a gaze direction of a second eye of the user are different from each other. Thus, a location of a selected portion of a peripheral region of a first optical element (corresponding to the first eye) could be different from a location of a selected portion of a peripheral region of a second optical element (corresponding to the second eye).

Optionally, the optical apparatus further comprises eye-tracking means and a processor configured to:
- process eye-tracking data, collected by the eye-tracking means, to determine gaze directions of a user's eyes;
- determine a given optical depth at which the user is gazing, based on at least one of: the gaze directions of the user's eyes, depth information of a real-world scene currently being seen by the user;
- determine an optical power prescribed for a given eye of the user corresponding to the given optical depth at which the user is gazing, the optical element being worn in front of the given eye of the user; and
- determine the given optical power to be produced, based on the optical power prescribed for the given eye of the user.

The technical benefit of such a gaze-based selection is that the optical power can be adjusted at the portion of the peripheral region in real time or near-real time according to the user's gaze. In other words, the optical power of the portion of the peripheral region is automatically adjusted to a required optical power depending on a viewing distance between the user and a region at which the user is gazing. This enables the user to see objects (whether nearby or faraway) clearly at all times. As an example, the user may be installing a lighting fixture on a ceiling of a room, while her/his tools may be lying on a floor of the room. In such a case, the user may need to look at the lighting fixture and at the tools at different points in time, via a top portion and a bottom portion of the peripheral region, when the optical apparatus is worn by the user. Appropriate optical powers are produced at the top portion and the bottom portion of the peripheral region, when the user needs to focus on the lighting fixture (namely, a nearby object) and the tools (namely, faraway objects). The eye-tracking means has already been described earlier in detail.

Optionally, the given optical depth at which the user is gazing is determined based on a convergence of the gaze directions of the user's eyes. In this regard, the given optical depth can be determined, based on an inter-pupillary distance of the user, by using triangulation. Additionally or alternatively, the given optical depth can be determined based on the depth information and the given gaze direction of the given eye of the user. In this regard, the depth information can be collected using at least one of: a depth camera, a time-of-flight (ToF) camera, an ultrasound imaging sensor, a radar, a light detection and ranging (LiDAR) sensor.

The user may have both presbyopia and myopia, or may have presbyopia only. In any case, different optical powers can be prescribed for the given eye of the user corresponding to different optical depths. When determining the optical power corresponding to the given optical depth, the optical power is selected, from amongst the different optical powers prescribed for the different optical depths, based on the given optical depth.

Optionally, the optical apparatus further comprises:
- a frame employed to hold the at least one optical element; and
- at least one input means, mounted on a temple of the frame, that is to be used by a user to switch on or switch off the at least one optical element to activate or deactivate the adjustable optical power in the peripheral region.

In this regard, the frame is designed in a manner that the at least one optical element is firmly arranged on the frame. In an example, when the optical apparatus is implemented as a pair of eyeglasses, the frame may hold two optical elements, wherein a first optical element is employed for the first eye of the user, and a second optical element is employed for the second eye of the user. It will be appreciated that material of the frame could be plastic, metal, polymer, and the like.

The at least one input means could be implemented as one of: a physical slider, a button. The at least one input means provides a flexibility to the user using the optical apparatus by allowing the user to conveniently switch on or switch off the at least one optical element, as and when required. This may, for example, be beneficial in a scenario where the user may require the positive optical power only for a shorter duration of time during a typical day, such as when he/she wants to read or focus on nearby objects. Furthermore, in this way, power resources of the optical apparatus could also be saved.

Optionally, the optical apparatus further comprises a power source to supply electrical power to the processor as well as to the aforesaid electrodes of the at least one active optical element. The power source and the processor may be installed at any suitable location on the optical apparatus. As an example, when the optical apparatus is implemented as a pair of glasses, the power source and the processor may be installed at a frame of said pair of glasses. The power source and/or the processor can be located at a bridge or an end of the temple of the frame.

Optionally, the optical apparatus further comprising a processor and a wireless communication interface that is to be employed to communicably couple the processor of the optical apparatus to a computing device, wherein the computing device is to be used by a user for at least one of:

switching on or switching off the at least one optical element to activate or deactivate the adjustable optical power in the peripheral region, inputting the given optical power to be produced.

Examples of the wireless communication interface may include, but are not limited to, Internet and Bluetooth®. Examples of the computing device include, but are not limited to, a cell phone, a laptop computer, a desktop computer, a tablet computer, a phablet, a personal digital assistant. It will be appreciated that optionally an interactive user interface is provided on the computing device, to enable the user for performing at least one of the aforesaid operations on the computing device. It will also be appreciated that prior to inputting the given optical power to be produced, the at least one optical element could be in a preset mode, wherein a certain optical power (for example, the fixed optical power) is already set for the at least one optical element. Using the computing device such optical power could be easily adjusted by the user, as and when required.

Notably, the at least one active optical element surrounds the passive optical element in a manner that the passive optical element forms the central region of the optical element, whereas the at least one active optical element forms the peripheral region of the optical element. The electrical connections are drawn from the at least one active optical element, for example, for providing the at least one given voltage to the at least one active optical element in order to produce (i.e., to adjust) the given optical power at the portion of the peripheral region. It will be appreciated that the at least one active optical element are bonded (namely, laminated) with the passive optical element, for example, using an optically clear adhesive film, to produce the optical element. Optionally, the aforesaid lamination could be performed by employing at least one of: an optical lamination technique, an optical bonding technique. Such techniques are well-known in the art.

DETAILED DESCRIPTION OF THE DRAWINGS

Figure 1B:
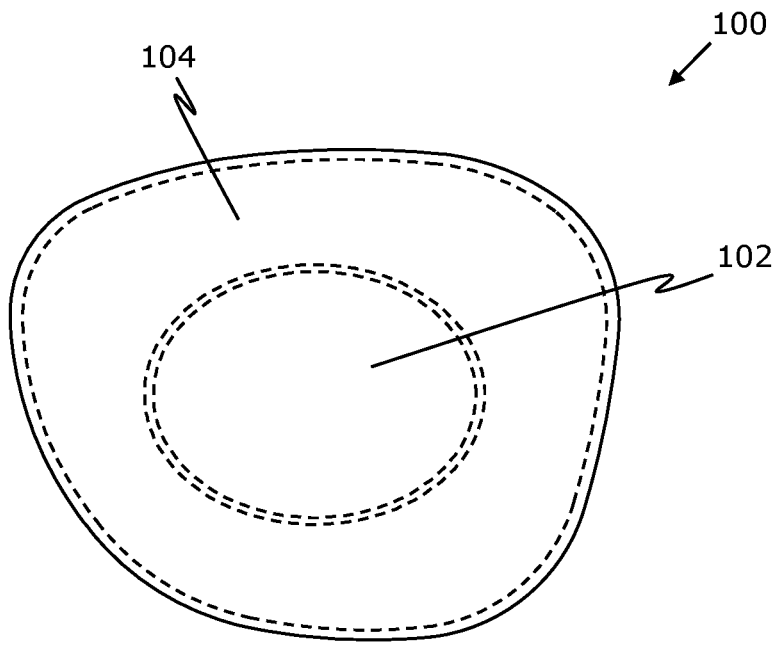

Referring to FIGS. 1A and 1B, illustrated are schematic diagrams of an optical element 100, in accordance with different embodiments of the present disclosure. The optical element 100 comprises a central region 102 and a peripheral region 104 surrounding the central region. With reference to FIG. 1A, the central region 104 has a fixed optical power, and at least one portion (for example, depicted as four portions 106a-d) of the peripheral region 104 has adjustable optical power. In such a case, the central region 102 comprises a passive optical element, and the at least one portion of the peripheral region 104 comprises at least one active optical element. In other words, the portions 106a-d could be implemented as separate active optical elements.

With reference to FIG. 1B, the central region 102 has a fixed optical power, whereas an entirety of the peripheral region 104 (depicted in a form of an annular ring) has an adjustable optical power. In such a case, the central region 102 comprises a passive optical element, and the entirety of the peripheral region 104 comprises an active optical element that is annular in shape.

FIGS. 1A and 1B are merely examples, which should not unduly limit the scope of the claims herein. It is to be understood that the specific implementations of the optical element 100 are provided as examples and are not to be construed as limiting it to specific numbers, sizes, or shapes of portions of the peripheral region. A person skilled in the art will recognize many variations, alternatives, and modifications of embodiments of the present disclosure.

Referring to FIGS. 2A-2C, illustrated are cross-sectional views of an active optical element, in accordance with various embodiments of the present disclosure. The active optical element 200 comprises a first substrate 202, a second substrate 204, an active material 206, at least one first electrode 208, and at least one second electrode 210. The active material 206 is encased between the first substrate 202 and the second substrate 204. The at least one first electrode 208 is deposited on the first substrate 202, and is disposed between the first substrate 202 and the active material 206. Likewise, the at least one second electrode 210 is deposited on the second substrate 204, and is disposed between the second substrate 204 and the active material 206. Optionally, the active optical element 200 further comprises a processor 212 and a sealing contour 214.

As shown in FIG. 2A, the first substrate 202 could be implemented as a planoconvex lens whose convex surface faces the active material 206, and whose curvature corresponds to a given optical power that is to be produced (for example, such as a positive optical power that is prescribed to a user having presbyopia). Alternatively, as shown in FIGS. 2B-2C, the first substrate 202 could be implemented as a Fresnel lens having concentric grooves, wherein the concentric grooves face the active material 206. In such a case, the concentric grooves of the Fresnel lens are formed to emulate characteristics of the aforesaid planoconvex lens.

Optionally, at least one of: the first substrate 202, the second substrate 204 could be implemented as a passive optical element. With reference to FIG. 2C, the second substrate 204 functions as a passive optical element, and is implemented as a planoconcave lens whose curvature corresponds to a negative optical power (namely, a fixed optical power).

In an implementation that works on the principle of refractive index matching and where the active material 206 is a liquid crystal material, a refractive index of the liquid crystal material can be adjusted to produce the given optical power. When the refractive index of the liquid crystal material matches a refractive index of the first substrate 202, an interface between the first substrate 202 and the active material 206 disappears. As a result, the active optical element 200 produces a fixed optical power (namely, a zero optical power or a negative optical power), depending on the curvature of outer surfaces of the first substrate 202 and the second substrate 204.

FIGS. 2A-2C are merely examples, which should not unduly limit the scope of the claims herein. It is to be understood that the specific implementations of the active optical element 200 are provided as examples and are not to be construed as limiting it to specific arrangements of the first substrate, the second substrate, the at least one first electrode and the at least one second electrode, or to specific curvatures of the first substrate and/or the second substrate. A person skilled in the art will recognize many variations, alternatives, and modifications of embodiments of the present disclosure.

Figure 3:
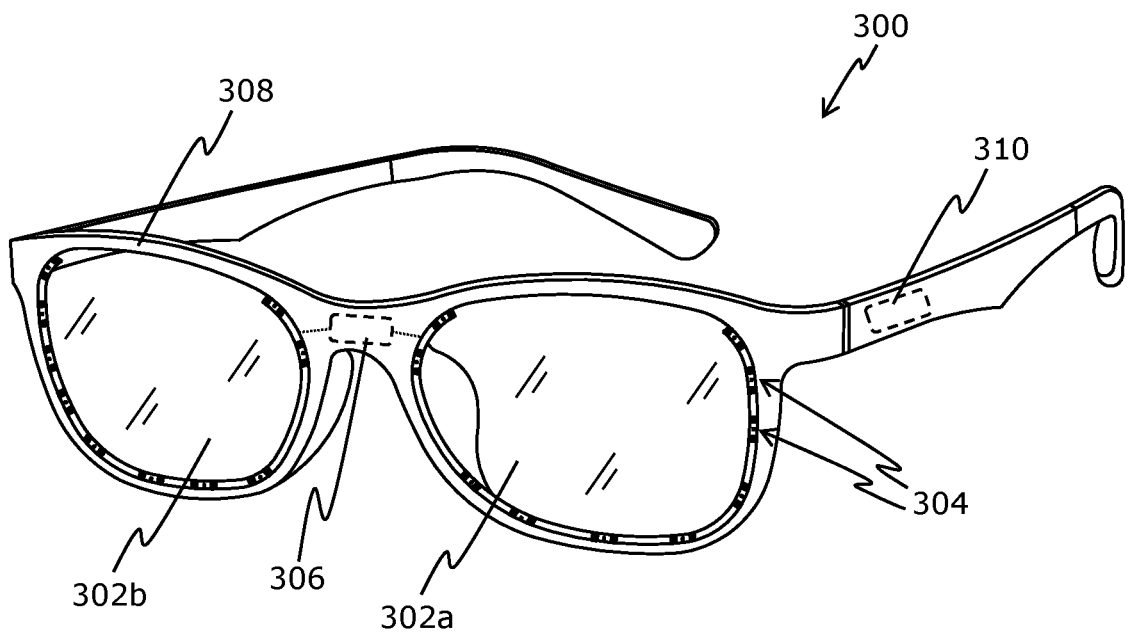
FIG. 3 illustrates a schematic diagram of an optical apparatus, in accordance with an embodiment of the present disclosure.

FIG. 3 illustrates a schematic diagram of an optical apparatus 300, in accordance with an embodiment of the present disclosure. As shown, the optical apparatus 300 is implemented as a pair of eyeglasses. The optical apparatus 300 comprises at least one optical element (for example, depicted as optical elements 302*a-b*). Optionally, the optical apparatus 300 further comprises eye-tracking means 304, a processor 306, a frame 308 for holding the optical elements 302*a-b*, and at least one input means (depicted as input means 310) mounted on a temple of the frame 308. Optionally, the optical apparatus 300 further comprises a wireless communication interface (not shown) to communicably couple the processor 306 to a computing device (not shown).

FIG. 3 is merely an example, which should not unduly limit the scope of the claims herein. It is to be understood that the specific implementation of the optical apparatus 300 is provided as an example and is not to be construed as limiting it to specific numbers or types of optical elements, eye-tracking means, processors, frames, input means, and wireless communication interfaces. A person skilled in the art will recognize many variations, alternatives, and modifications of embodiments of the present disclosure.

Figure 4:
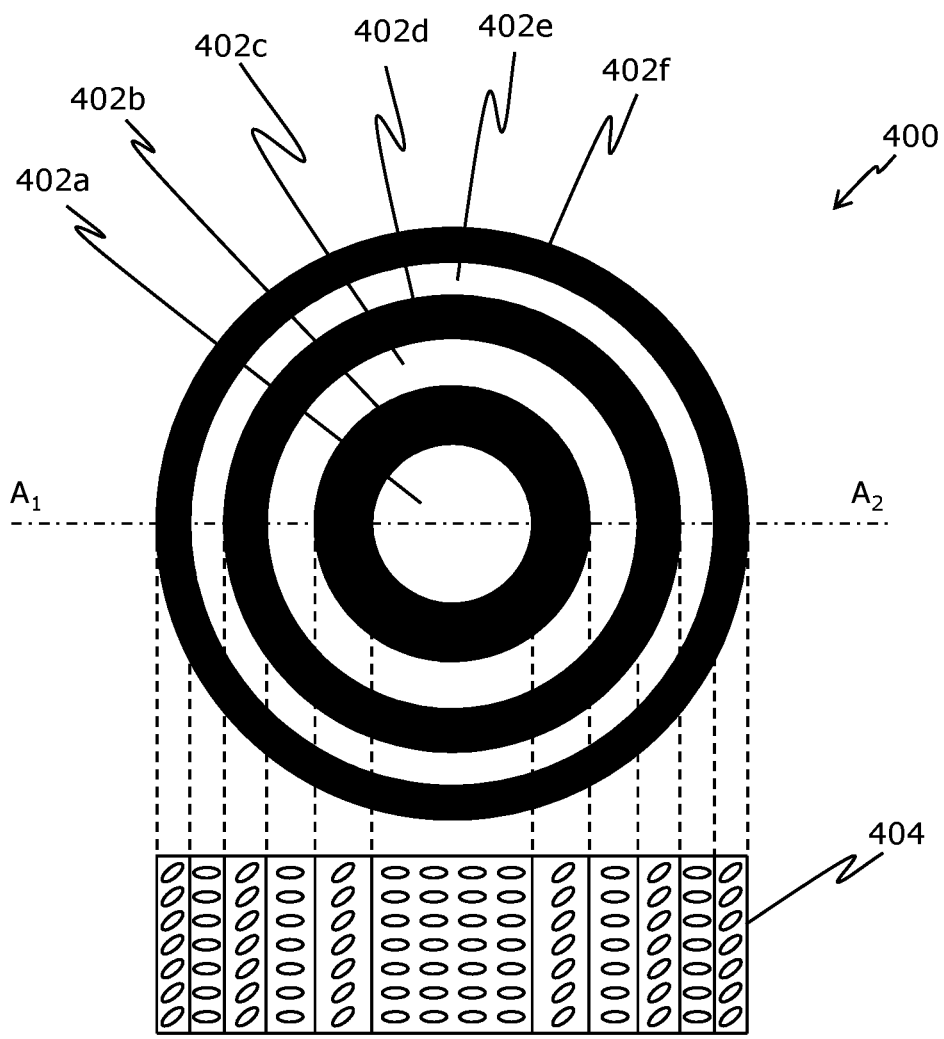
FIG. 4 illustrates a schematic diagram of a liquid crystal Fresnel lens, in accordance with an embodiment of the present disclosure.

FIG. 4 illustrates a schematic diagram of a liquid crystal Fresnel lens, in accordance with an embodiment of the present disclosure. The liquid crystal Fresnel lens 400 comprises a plurality of concentric zones 402*a-f* in which a refractive index of a liquid crystal material is to be adjusted differently to emulate characteristics of a Fresnel lens. A cross-section 404 of the liquid crystal Fresnel lens 400 across line A1-A2, shown at a bottom part of FIG. 4, depicts that the refractive index of the liquid crystal material is adjusted by controlling an alignment of liquid crystal molecules in the plurality of concentric zones 402*a-f*.

FIG. 4 is merely an example, which should not unduly limit the scope of the claims herein. A person skilled in the art will recognize many variations, alternatives, and modifications of embodiments of the present disclosure.

Figure 5:
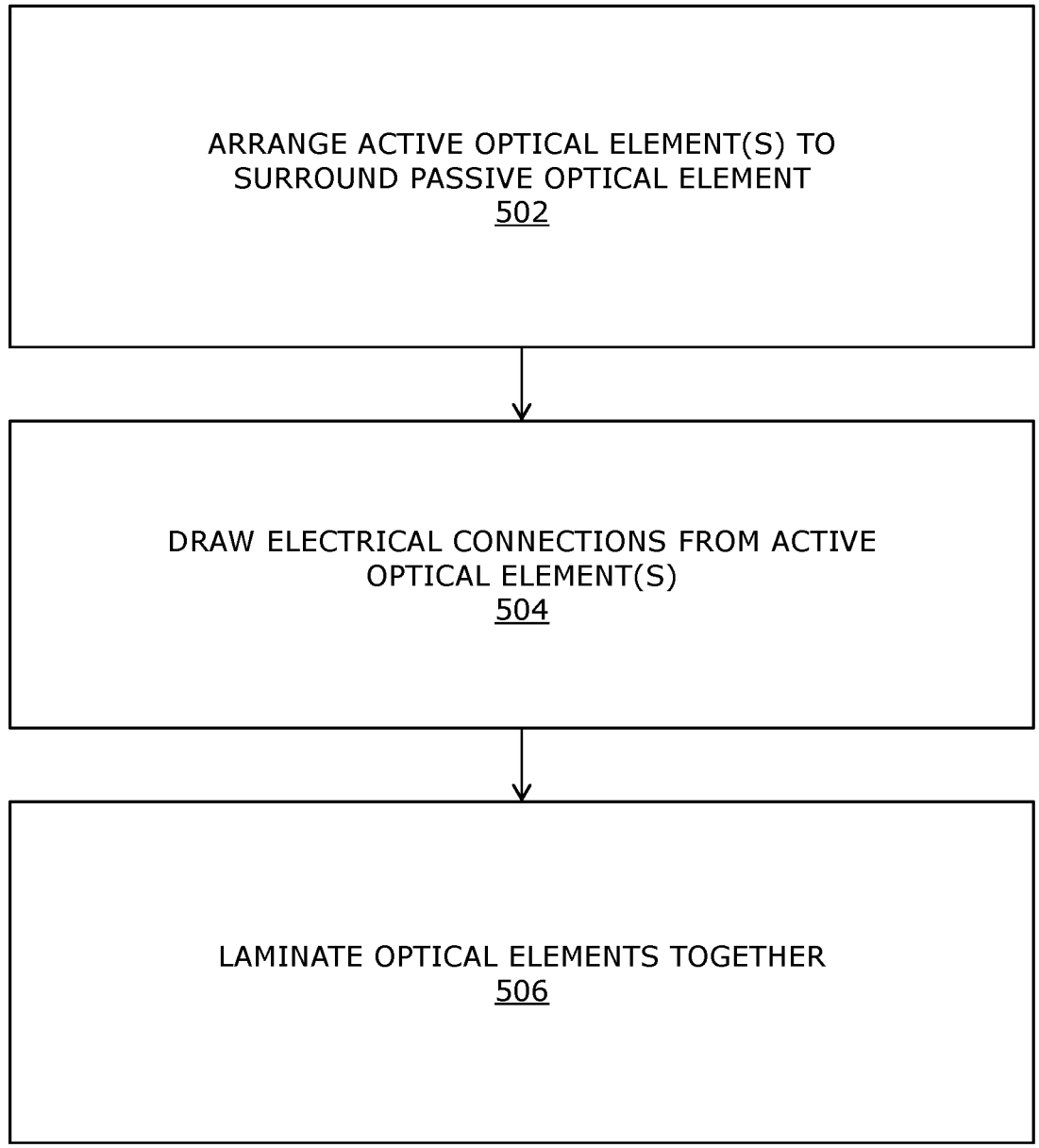
FIG. 5 illustrates steps of a method of manufacturing an optical element, in accordance with an embodiment of the present disclosure.

FIG. 5 illustrates steps of a method of manufacturing an optical element, in accordance with an embodiment of the present disclosure. At step 502, at least one active optical element is arranged to surround a passive optical element. At step 504, electrical connections are drawn from the at least one active optical element. At step 506, the at least one active optical element is laminated together with the passive optical element to produce the optical element, wherein a central region of the optical element, comprising the passive optical element, has a fixed optical power, the fixed optical power being one of: a zero optical power, a negative optical power, and wherein at least a portion of a peripheral region of the optical element, comprising the at least one active optical element, has an adjustable optical power.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An optical element comprising:
a central region having a fixed optical power, wherein the fixed optical power is one of: a zero optical power, a negative optical power; and
a peripheral region surrounding the central region, at least a portion of the peripheral region having an adjustable optical power, wherein the optical power of the portion of the peripheral region is to be selectively adjusted to produce a given optical power,
wherein when the fixed optical power is the zero optical power, the given optical power is a positive optical power, and
when the fixed optical power is the negative optical power, the given optical power is one of: the positive optical power, the negative optical power.

2. The optical element of claim 1, wherein the central region comprises a passive optical element, and the peripheral region comprises at least one active optical element comprising:
a first substrate and a second substrate that are optically transparent;
an active material encased between the first substrate and the second substrate;
at least one first electrode deposited on the first substrate and disposed between the first substrate and the active material, the at least one first electrode being optically transparent; and
at least one second electrode deposited on the second substrate and disposed between the second substrate and the active material, the at least one second electrode being optically transparent.

3. The optical element of claim 2, wherein the at least one first electrode is driven at: at least one given voltage that corresponds to the given optical power to be produced.

4. The optical element of claim 3, wherein the at least one active optical element further comprises a processor configured to:
select the at least one given voltage based on the given optical power to be produced; and
generate a drive signal to drive the at least one first electrode.

5. The optical element of claim 2, wherein the at least one first electrode is driven to control at least one of: a curvature of a meniscus, a refractive index, of the active material in the at least one active optical element.

6. The optical element of claim 5, wherein the active material comprises an electrically-conducting liquid and an electrically-insulating liquid, wherein the curvature of the meniscus of the active material is controlled to produce the given optical power, the meniscus being a liquid-liquid interface between the electrically-conducting liquid and the electrically-insulating liquid.

7. The optical element of claim 5, wherein the active material is a liquid crystal material, wherein an alignment of liquid crystal molecules in the liquid crystal material is controlled to adjust the refractive index of the liquid crystal material, thereby producing the given optical power.

8. The optical element of claim 2, wherein the at least one active optical element comprises a plurality of active optical elements, and wherein the portion of the peripheral region having the adjustable optical power is discontinuous.

9. The optical element of claim 2, wherein the at least one active optical element comprises a single active optical element that is in a form of an annular ring, and wherein the portion of the peripheral region having the adjustable optical power is continuous.

10. The optical element of claim 1, wherein the central region is shaped as a simple closed curve.

11. An optical apparatus comprising at least one optical element of claim 1.

12. The optical apparatus of claim 11, further comprising eye-tracking means and a processor configured to:
- process eye-tracking data, collected by the eye-tracking means, to determine a gaze direction of a given eye of a user in front of which the optical element is being worn; and
- select the portion of the peripheral region whereat the given optical power is to be produced, based on the gaze direction of the given eye of the user.

13. The optical apparatus of claim 11, further comprising eye-tracking means and a processor configured to:
- process eye-tracking data, collected by the eye-tracking means, to determine gaze directions of a user's eyes;
- determine a given optical depth at which the user is gazing, based on at least one of: the gaze directions of the user's eyes, depth information of a real-world scene currently being seen by the user;
- determine an optical power prescribed for a given eye of the user corresponding to the given optical depth at which the user is gazing, the optical element being worn in front of the given eye of the user; and
- determine the given optical power to be produced, based on the optical power prescribed for the given eye of the user.

14. The optical apparatus of claim 11, further comprising:
- a frame employed to hold the at least one optical element; and
- at least one input means, mounted on a temple of the frame, that is to be used by a user to switch on or switch off the at least one optical element to activate or deactivate the adjustable optical power in the peripheral region.

15. The optical apparatus of claim 11, further comprising a processor and a wireless communication interface that is to be employed to communicably couple the processor of the optical apparatus to a computing device, wherein the computing device is to be used by a user for at least one of:
- switching on or switching off the at least one optical element to activate or deactivate the adjustable optical power in the peripheral region,
- inputting the given optical power to be produced.

16. A method of manufacturing an optical element, the method comprising:
- arranging at least one active optical element to surround a passive optical element;
- drawing electrical connections from the at least one active optical element; and
- laminating the at least one active optical element together with the passive optical element to produce the optical element, wherein a central region of the optical element, comprising the passive optical element, has a fixed optical power, the fixed optical power being one of: a zero optical power, a negative optical power, and wherein at least a portion of a peripheral region of the optical element, comprising the at least one active optical element, has an adjustable optical power.

17. The method of claim 16, wherein the at least one active optical element comprises a plurality of active optical elements, and wherein the portion of the peripheral region having the adjustable optical power is discontinuous.

18. The method of claim 16, wherein the at least one active optical element comprises a single active optical element that is in a form of an annular ring, and wherein the portion of the peripheral region having the adjustable optical power is continuous.

* * * * *